US008514302B2

(12) United States Patent
Utsugi

(10) Patent No.: US 8,514,302 B2
(45) Date of Patent: Aug. 20, 2013

(54) IMAGE PROCESSING EQUIPMENT AND DIGITAL CAMERA THAT FILTER NOISE

(75) Inventor: Akihiko Utsugi, Machida (JP)

(73) Assignee: Nikon Corporation, Tokyo (JP)

( * ) Notice: Subject to any disclaimer, the term of this patent is extended or adjusted under 35 U.S.C. 154(b) by 155 days.

(21) Appl. No.: 12/654,966

(22) Filed: Jan. 11, 2010

(65) Prior Publication Data
US 2010/0182452 A1 Jul. 22, 2010

(30) Foreign Application Priority Data

Jan. 19, 2009 (JP) ................................. 2009-009132
Nov. 20, 2009 (JP) ................................. 2009-264569

(51) Int. Cl.
H04N 5/217 (2011.01)
G06K 9/40 (2006.01)

(52) U.S. Cl.
USPC ........................................ 348/241; 382/264

(58) Field of Classification Search
USPC ........................... 348/241; 382/254, 260, 264
See application file for complete search history.

(56) References Cited

U.S. PATENT DOCUMENTS

| 5,119,195 A * | 6/1992 | Christopher ................. 348/623 |
| 5,448,303 A * | 9/1995 | Desor et al. .................. 348/618 |
| 5,929,936 A * | 7/1999 | Arai et al. ..................... 348/607 |
| 6,714,258 B2 * | 3/2004 | Stessen et al. ................ 348/607 |
| 6,937,772 B2 | 8/2005 | Gindele |
| 7,929,031 B2 * | 4/2011 | Nakayama .................... 348/241 |
| 2009/0021611 A1 * | 1/2009 | Utsugi ........................ 348/241 |
| 2010/0182462 A1 * | 7/2010 | Utsugi ........................ 348/241 |
| 2011/0134292 A1 * | 6/2011 | Hirai ............................ 348/280 |

FOREIGN PATENT DOCUMENTS

| JP | A-05-103231 | 4/1993 |
| JP | A-08-149344 | 6/1996 |
| JP | A-2000-224421 | 8/2000 |
| JP | A-2008-293424 | 12/2008 |

OTHER PUBLICATIONS

Office Action dispatched May 14, 2013 in counterpart Japanese Patent Application No. 2009-264569 (with English translation).

* cited by examiner

Primary Examiner — Timothy J Henn
(74) Attorney, Agent, or Firm — Oliff & Berridge, PLC

(57) ABSTRACT

An image processing equipment generates a reduced image corresponding to an obtained image in parallel with a processing of storing the generated reduced image in a reduced image storing part, and pipelines a processing of extracting a low-frequency noise component of each of pixels included in the obtained image and a processing of sequentially subtracting the low-frequency being extracted from pixel data corresponding to one of the obtained image stored in the image storing part and an adjusted image generated from the obtained, so as to achieve a pipeline processing of a multi-resolution noise filtering with a few line memories.

20 Claims, 7 Drawing Sheets

LINE MEMORY OF
NOISE COMPONENT EXTRACTING PART

LINE MEMORY OF
UP-SAMPLING PART

US 8,514,302 B2

IMAGE PROCESSING EQUIPMENT AND DIGITAL CAMERA THAT FILTER NOISE

CROSS REFERENCE TO THE RELATED APPLICATIONS

This application is based upon and claims the benefit of priority from Japanese Patent Application No. 2009-009132 and Japanese Patent Application No. 2009-264569, filed on Jan. 19, 2009 and Nov. 20, 2009, the entire contents of which are incorporated herein by reference.

BACKGROUND

1. Field

The present embodiments relate to an image processing equipment and a digital camera to apply a noise filtering using a multi-resolution analysis for an obtained image.

2. Description of the Related Art

A noise filtering using a multi-resolution analysis (hereinafter, called as a multi-resolution noise filtering) is known as one of methods to filter low-frequency noises appeared in an image data obtained by a digital camera and so on.

The multi-resolution noise filtering is an art in which noise filtering effects for reduced images generated with plural reduction ratios are reflected on an original sized image, and thereby, for example, the filtering of low-frequency noises spreading for several dozen pixels in a row direction and/or a column direction is achieved (refer to Japanese Unexamined Patent Application Publication No. 2000-224421).

For example, a down-sampling is applied to an original image with reduction ratios of one-fourth respectively in the row direction and the column direction to generate a reduced image in one-sixteenth, and low-frequency noise components in the original image can be estimated by performing an up-sampling using a linear interpolation on the noise components extracted from this reduced image. The low-frequency noise components estimated as stated above are subtracted from the original image, and thereby, the low-frequency noise components can be filtered from the original image.

In a recent high pixel digital camera, there is a case when the low-frequency noises spreading for several dozen pixels wide appear. It is necessary to prepare line memories storing an image data in a range larger than a range assumed to be a spread of the low-frequency noises so that the filtering of the low-frequency noises as stated above is promptly performed by a pipeline processing.

However, if such vast line memories are prepared, a significant increase in a circuit scale is caused, and it leads an increase in cost of an image processing circuit.

SUMMARY

A proposition of the present embodiments is to provide an image processing equipment and a digital camera achieving a pipelined multi-resolution noise filtering with a few line memories.

The above-stated proposition can be achieved by an image processing equipment and a digital camera disclosed hereinafter.

An image processing equipment and a digital camera according to a first aspect includes an image reducing part generating a reduced image of an obtained image being read, a reduced image storing part storing the reduced image being generated, an image storing part storing the obtained image in parallel with a processing by the image reducing part, a low-frequency noise component extracting part sequentially extracting a low-frequency noise component of each of pixels included in the obtained image based on pixel data of pixels included in a predetermined area of the reduced image at a portion corresponding to each of the pixels included in the obtained image, and a noise subtracting part sequentially reading pixel data corresponding to the obtained image stored in the image storing part or an adjusted image generated from the obtained image in synchronization with an output of the low-frequency noise component being extracted, and sequentially subtracting the low-frequency noise component from the pixel data being read, and respective processings by the low-frequency noise component extracting part and the noise subtracting part are pipelined.

DETAILED DESCRIPTION OF THE EMBODIMENTS

Hereinafter, embodiments are described in detail based on the drawings.

Embodiment 1

Figure 1:
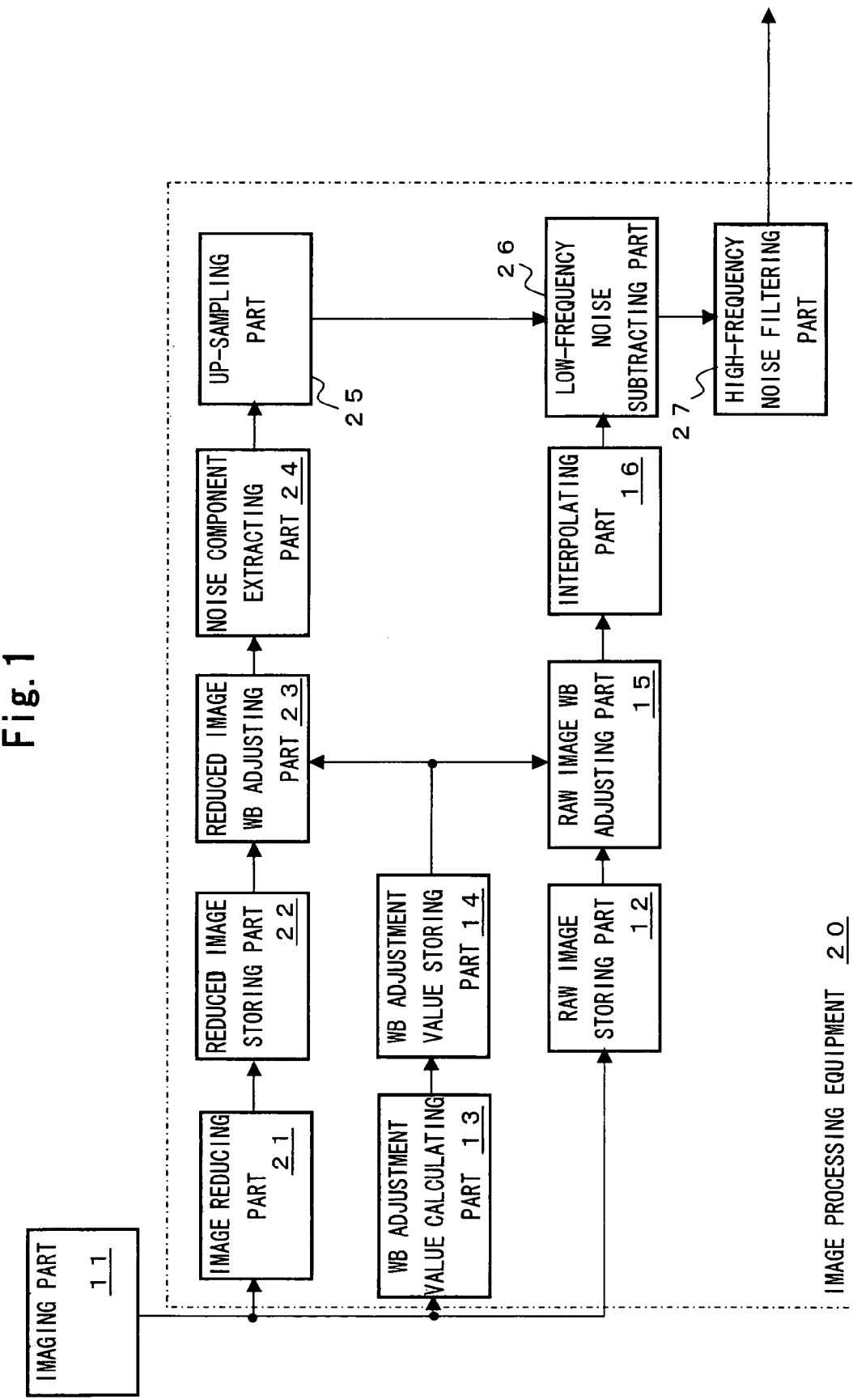
FIG. 1 is a view illustrating an embodiment of an image processing equipment.

An embodiment of an image processing equipment is illustrated in FIG. 1.

An image processing equipment 20 illustrated in FIG. 1 obtains a RAW image data from an imaging part 11 of a digital camera. The RAW image data includes a pixel data representing an intensity of color components corresponding to color filters disposed at respective pixels included in an image sensor provided in the imaging part 11. The color filters of the respective pixels included in the image sensor are disposed in accordance with, for example, a Bayer-array.

The respective pixel data included in the RAW image are stored in a RAW image storing part 12. A white balance (WB) adjustment value calculating part 13 calculates a white balance adjustment value necessary for an automatic white balance adjustment in parallel with the above process. The calculated white balance adjustment value is stored in a white balance (WB) adjustment value storing part 14.

Besides, an image reducing part 21 generates a reduced image with, for example, a reduction ratio of one-fourth from the respective pixel data included in the RAW image in parallel with the calculation processing of the white balance adjustment value, and the created reduced image is stored in a reduced image storing part 22.

For example, the image reducing part 21 generates the reduced image as stated below. At first, the image reducing part 21 averages pixel values of G pixels positioning at opposing corners of a range in two rows two columns of the RAW image, to set it as a pixel value of a G component of a reduced image with a reduction ratio of a half corresponding to this range. Besides, the image reducing part 21 sets pixel values of R pixels and B pixels included in the range as pixel values of R, B components of the same pixel of the reduced image respectively. The image reducing part 21 performs a smoothing processing respectively in a row direction and a column direction on the reduced image. By this, the reduced image having the reduction ratio of one-half is generated. After that, for example, the image reducing part 21 obtains the reduced image having the reduction ratio of one-fourth by extracting one pixel out from two pixels in row and column direction.

As stated above, the calculation processing of the white balance adjustment value and the generation processing of the reduced image are performed in the image processing equipment 20 in parallel with the storing processing of the RAW image to the RAW image storing part 12. It is possible to complete the storing processing of the white balance adjustment value and the reduced image to the white balance adjustment value storing part 14 and the reduced image storing part 22 at the same time when the storing of the RAW image is completed.

A reduced image white balance (WB) adjusting part 23 reads the respective pixels of the reduced image from the above-stated reduced image storing part 22 prior to a reading of the pixel data of the respective pixels included in the RAW image stored in the RAW image storing part 12. The reduced image white balance adjusting part 23 performs the automatic white balance adjusting processing for the reduced image by using the white balance adjustment value.

The pixel data of the respective pixels of the reduced image are sequentially passed to a noise component extracting part 24, and stored in a line memory included in the noise component extracting part 24 after the automatic white balance adjustment is applied as stated above.

Figure 2:
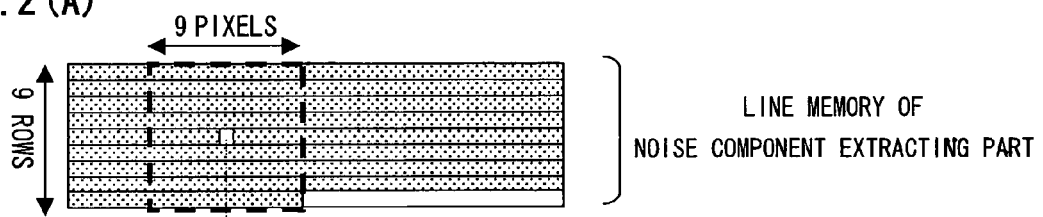
FIG. 2(A) to FIG. 2(C) are views explaining a relation between a reduced image and an extracted noise component.
Figure 2:
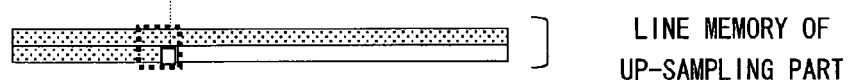
Figure 2:
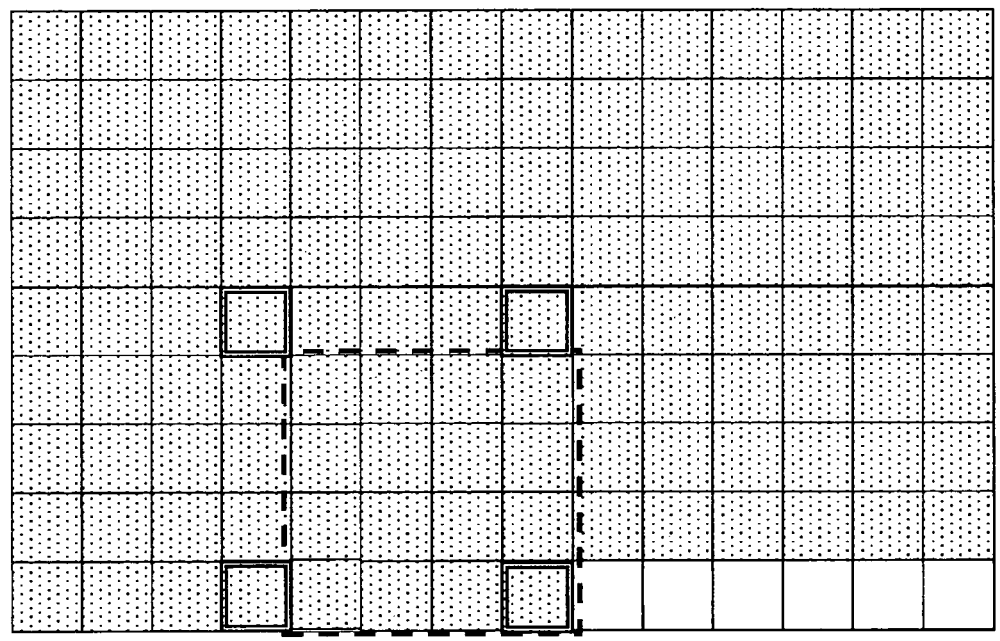

FIGS. 2(A) to 2(C) represent the explanation of relationship between the reduced image and the noise component which is extracted. The noise component extracting part 24 refers to the pixel data of the respective pixels included in a predetermined range of reference centering on a noise component extraction object pixel, and extracts a noise component in the noise component extraction object pixel. In an example illustrated in FIG. 2(A), the range of reference is set at a range of the reduced image of nine rows×nine pixels centering on the noise component extraction object pixel represented by an outlined square. The noise component extracting part 24 performs the processing to extract the noise component in the noise component extraction object pixel when the pixels of the reduce image which are included in the nine rows×nine pixels as stated above is stored in the line memory.

Every time when the pixel data of a new pixel of the reduced image is passed from the reduced image white balance adjusting part 23, the noise component extracting part 24 extracts the noise component corresponding to the pixel positioning at a center in the predetermined range of reference including this pixel. The extracted noise components are sequentially passed to an up-sampling part 25, and stored in a line memory (refer to FIG. 2(B)) included in the up-sampling part 25.

In the up-sampling part 25, a low-frequency noise component corresponding to an original sized image before reduction is calculated by performing a later-described up-sampling processing for the extracted noise component.

In accordance with an input of the noise component corresponding to the new pixel, the up-sampling part 25 performs the up-sampling processing on the noise component corresponding to the pixel included in the predetermined range of the reduced image including this pixel. The low-frequency noise components corresponding to the respective pixels included in the range of the image before reduction corresponding to the range of the reduced image can be obtained by the up-sampling processing. Namely, the up-sampling processing by the up-sampling part 25 corresponds to an "enlarging process" to obtain the low-frequency noise component in the original sized image before reduction based on the noise component extracted from the reduced image.

FIG. 2(B) illustrates a relationship between a pixel corresponding to a noise component newly input to the up-sampling part 25 and a range of the pixels corresponding to the noise component referenced in the up-sampling processing performed in accordance with the input of the noise component. In FIG. 2(B), the pixel corresponding to the newly input noise component is represented by an outline. Besides, the range of the pixels to be an object of the up-sampling processing by the up-sampling part 25 in accordance with the input of this noise component is represented by surrounding with a thick dotted line in FIG. 2(B). In the example illustrated in FIG. 2(B), the pixel corresponding to the newly input noise component and the noise components corresponding to the already input pixels positioning around the pixel are provided for the up-sampling processing by the up-sampling part 25. The low-frequency noise components corresponding to the respective pixels within a range of the original sized image are calculated by this up-sampling processing. This range corresponds to the range of reduced image corresponding to the low frequency noise components within the range for the up-sampling processing. The range of the original sized image illustrated by surrounding with thick dotted line in FIG. 2(C) is corresponding to the range of the reduced image illustrated by surrounding with thick dotted line in FIG. 2(B). The up-sampling part 25 performs, for example, a linear interpolating process on the noise components stored in the line memory with correspond to the above-stated range of the reduced image. Accordingly, the low-frequency noise components corresponding to the respective pixels of the original sized image included in the range corresponding to the range of the reduced image are calculated. Incidentally, in FIG. 2(C), pixels represented by double frames correspond to four pixels in the reduced image represented by surrounding with the thick dotted line in FIG. 2(B).

In the image processing equipment 20 illustrated in FIG. 1, the reading of the reduced image necessary for the calculation of the low-frequency noise component corresponding to the adjustment object pixel is preceded, and thereafter, the reading of the pixel data of the respective pixels included in the RAW image stored in the RAW image storing part 12 is started.

A RAW image white balance (WB) adjusting part 15 applies the automatic white balance adjustment using the above-stated white balance adjustment value to the pixel data sequentially read out of the RAW image storing part 12. Subsequently, the pixel data after the automatic white balance adjustment is passed to an interpolating part 16, and the pixel data of the RGB components corresponding to the respective pixels are calculated.

The pixel data of the respective pixels after the interpolating process are passed to a low-frequency noise subtracting part 26. The low-frequency noise subtracting part 26 performs a filtering of the low-frequency noises by subtracting the low-frequency noise components calculated by the up-sampling part 25 from the pixel data of the respective pixels after the interpolating process.

The low-frequency noise filtered image data is transmitted to a high-frequency noise filtering part 27, and the high-frequency noise filtering part 27 applies a high-frequency noise component filtering using a publicly known method. The image data after the high-frequency noise component is filtered is provided for a subsequent processing (for example, an image compression processing and so on).

As stated above, the image processing equipment 20 illustrated in FIG. 1 performs the generation of the reduced image in parallel with the storing processing of the RAW image to the RAW image storing part 12, and the generation of the reduced image corresponding to the original sized image for whole frame completes at the same time of the completion of storing the RAW image.

Accordingly, a pipeline processing performing the white balance adjustment and the low-frequency noise component calculation processing for the reduced image in parallel with the white balance adjustment and the interpolating process for the RAW image can be achieved. The above-stated pipeline processing requires the line memory storing the range of the reduced image necessary for the calculation of the low-frequency noise component corresponding to the noise filtering object pixel and the line memory required for the up-sampling processing.

For example, when the extraction of the noise components is performed on the range of nine rows×nine pixels in the reduced image as illustrated in FIG. 2(A), the line memory storing the reduced image for nine lines is provided at the noise component extracting part 24. Besides, the line memory which has a capacity for two lines of the reduced image is prepared at the up-sampling part 25. The range of nine rows× nine pixels in the reduce image corresponds to a range of 36 rows×36 pixels in the original size image. Accordingly, by using the above-stated line memory, it is possible to pipeline the processing of filtering the low-frequency noise having a spread of approximately 36 rows×36 pixels in the original size image.

Further, the high-frequency the noise filtering can be performed by providing a line memory having a capacity storing a range of the original sized image which has larger range than a range corresponding to one pixel of the reduced image at the high-frequency noise filtering part 27. For example, when one pixel of the reduce image corresponds to a range of four rows×four pixels, it is possible to set a reference range used in extracting the high-frequency noise component to a range of seven rows seven pixels having a noise filtering object pixel as its center. In this case, the line memory having a capacity of seven lines is prepared at the high-frequency noise filtering part 27. Accordingly, the high-frequency noise filtering processing filtering the high-frequency noise component having a repeated frequency nearly equal to a spatial frequency corresponding to one pixel of the reduced image from the original sized image is realized by a pipeline processing connected to the pipeline processing performing a low-frequency noise extraction processing as above-stated.

In the pipeline processing in the image processing equipment 20, it is not necessary to continuously store the original sized image from a point used in generating the reduced image to a point filtering the low-frequency noise component extracted from this reduced image. Accordingly, it is possible to achieve the pipeline processing with a few line memories as stated above.

Besides, the pipeline processing up to the generation of the reduced image is performed in parallel with the calculation processing of the white balance adjustment value, and the pipeline processing up to the low-frequency noise extraction is performed in parallel with the white balance adjustment applying processing and the interpolating process. An increase of a processing time caused by dividing the pipeline processing can be suppressed by combining a division of the pipeline relating to the white balance adjusting processing and a division of the pipeline relating to the multi-resolution noise filtering.

Incidentally, it is possible to combine the former pipeline processing and the latter pipeline processing achieving the multi-resolution noise filtering with a processing other than the calculation processing of the white balance adjustment value and the applying processing of the white balance adjustment value. Besides, it is also possible to perform the former pipeline processing and the latter pipeline processing achieving the multi-resolution noise filtering without combining any other pipeline processing.

Embodiment 2

Figure 3:
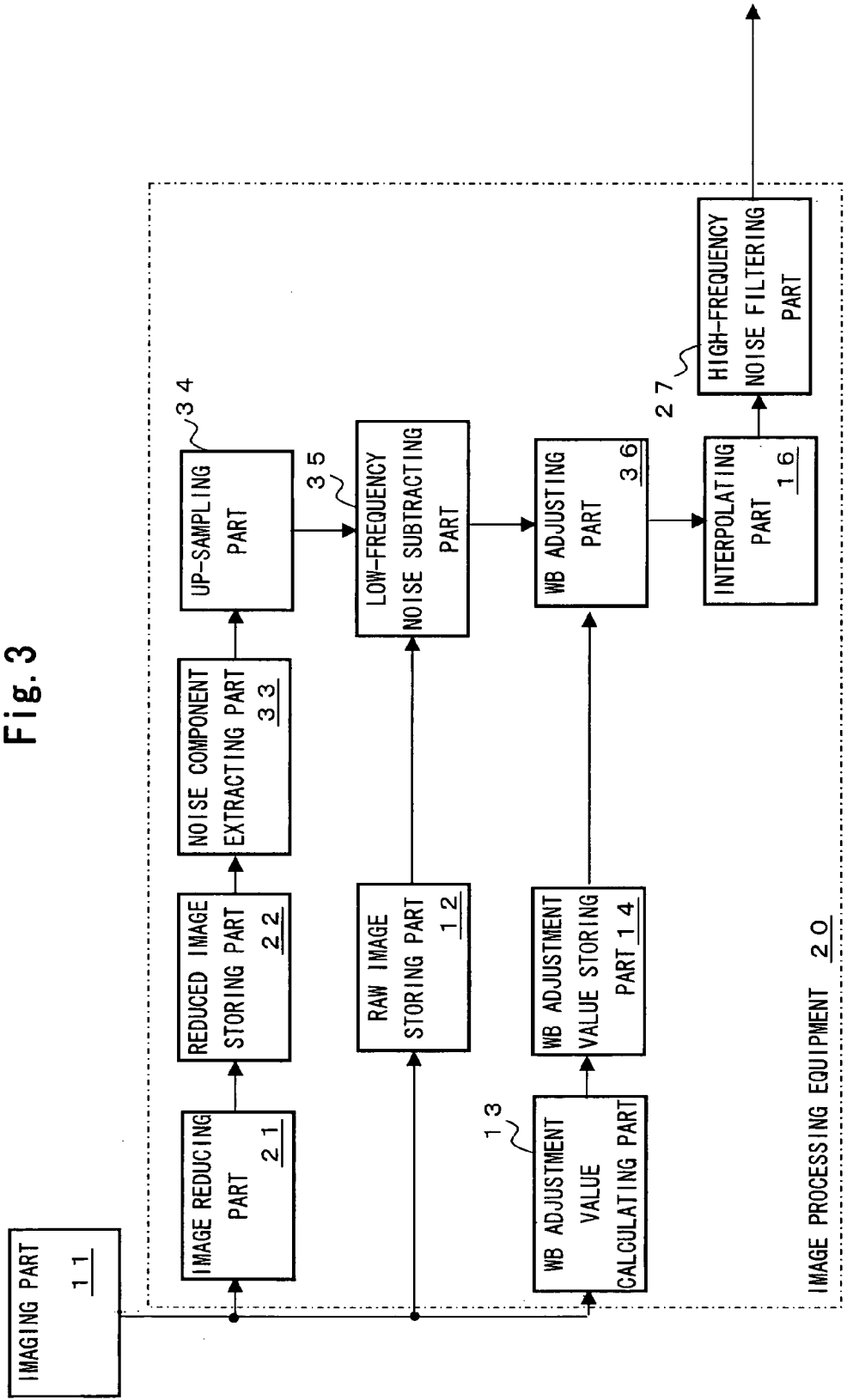
FIG. 3 is a view illustrating another embodiment of an image processing equipment.

Another embodiment of an image processing equipment is illustrated in FIG. 3.

Incidentally, among components illustrated in FIG. 3, the same reference numerals are added to the components equivalent of the components illustrated in FIG. 1, and description thereof is not given.

The image reducing part 21 illustrated in FIG. 3 generates reduced images by each of the RGB components, and stores in the reduced image storing part 22. A noise component extracting part 33 extracts noise components for the reduced images having color components corresponding to the noise components of each of the RGB components, and the extracted noise components are provided for a processing of an up-sampling part 34.

The up-sampling part 34 performs an up-sampling processing by applying a linear interpolating process and so on for the noise components extracted by the noise component extracting part 33 from the reduced images by each of the RGB components. Low-frequency noise components corresponding to pixels of respective color components included in an original sized image are calculated by this up-sampling processing.

A low-frequency noise subtracting part 35 sequentially reads pixel data of respective pixels included in the RAW image from the RAW image storing part 12, and subtracts the low-frequency noise components of corresponding color components calculated as stated above from the read pixel data. Accordingly, a pixel value having finished the filtering of the low-frequency noise components corresponding to respective color components is obtained for the each of the pixels included in the RAW image having arranged the pixels of the respective color components arranged in accordance with a Bayer-array.

A white balance (WB) adjusting part 36 performs an adjusting processing for the image in the Bayer-array of which low-frequency noise components are filtered as stated above by using a white balance adjustment value stored in the white balance adjustment value storing part 14. Next, the interpolating part 16 performs an interpolating process for the white balance adjusted Bayer pattern image. An original sized image which has all three color components for every pixel included in one frame is obtained by the interpolating process, and the image data is provided for a processing of the high-frequency noise filtering part 27.

In a structure illustrated in FIG. 3, the low-frequency noise components are filtered from the RAW image, and thereafter, the white balance adjustment and the interpolating process are performed. In this case also, it is possible to perform a pipeline processing of the multi-resolution noise filtering by using a few line memories as same as in the above-stated embodiment 1.

In this structure, the up-sampling part 34 may calculate the low-frequency noise components of the respective color components with correspond to the pixels in which color filters of the respective color components are disposed in the original sized Bayer pattern image. Accordingly, it is possible to drastically reduce a calculation amount compared to a case when all of the low-frequency noise components of the RGB components are calculated for all of the pixels included in the original sized image.

Embodiment 3

Figure 4:
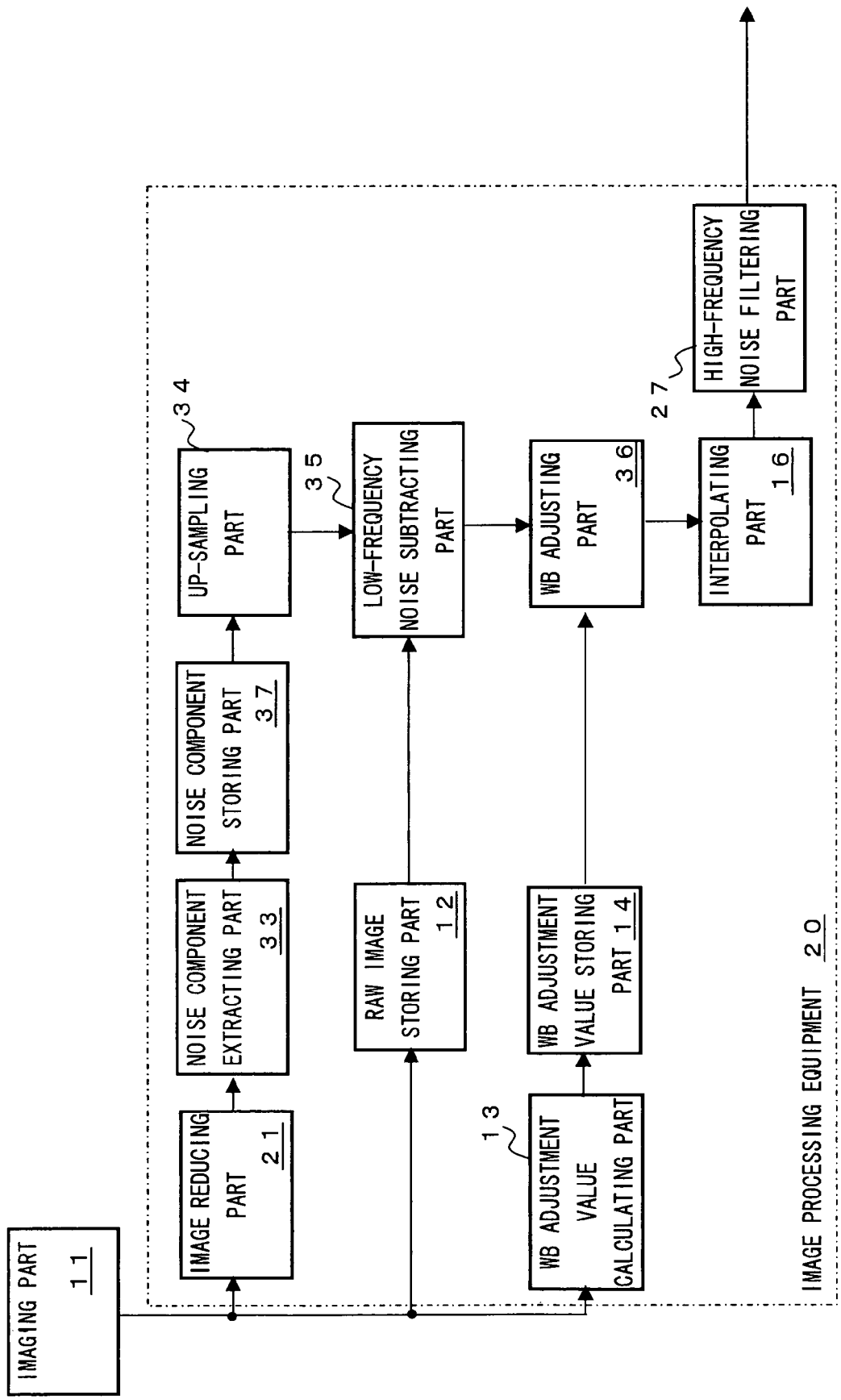
FIG. 4 is a view illustrating another embodiment of an image processing equipment.

Another embodiment of an image processing equipment is illustrated in FIG. 4.

Incidentally, among components illustrated in FIG. 4, the same reference numerals are added to the components equivalent of the components illustrated in FIG. 1 and FIG. 3, and description thereof is not given.

The noise component extracting part 33 performs the extraction processing of the low-frequency noise component in parallel with the process in which the image reducing part 21 generates the reduced images by each of the RGB components, in the image processing equipment illustrated in FIG. 4. The extracted low-frequency noise component is stored in a noise component storing part 37. That is, instead of storing the reduced image corresponding to the RAW image being input at a reduced image storing part 22, the low-frequency noise component extracted by the noise component extracting part 33 is stored corresponding to respective pixels included in the reduced image.

In this structure, a storing processing of the low-frequency noise components extracted for the respective pixels included in the reduced image into the noise component storing part 37 is completed at a stage when the RAW image for one frame is stored in the RAW image storing part 12.

Accordingly, the up-sampling part 34 reads the noise components applying the up-sampling processing into the line memory from the noise component storing part 37 prior to a timing when the pixel values of the respective pixels included in the RAW image related to these low-frequency noise components are read out. The low-frequency noise components read in the line memory are the low-frequency noise components corresponding to a portion of the reduced image including a line corresponding to a line of the RAW image including the pixels being read out from the RAW image storing part 12 and a preceding line. The up-sampling part 34 performs the linear interpolating process on the low-frequency noise component for the two lines of the reduced image already read into the line memory in synchronization with the reading out of the pixel data of the respective pixels from the RAW image storing part 12. Accordingly, the low-frequency noise components are generated with correspond to the pixel data of the respective pixels of the RAW image, the generated low-frequency noise components are passed to the low-frequency noise subtracting part 35, and the low-frequency noise components are subtracted from respective pixel values of the RAW image corresponding to the low-frequency noise components.

Embodiment 4

Figure 5:
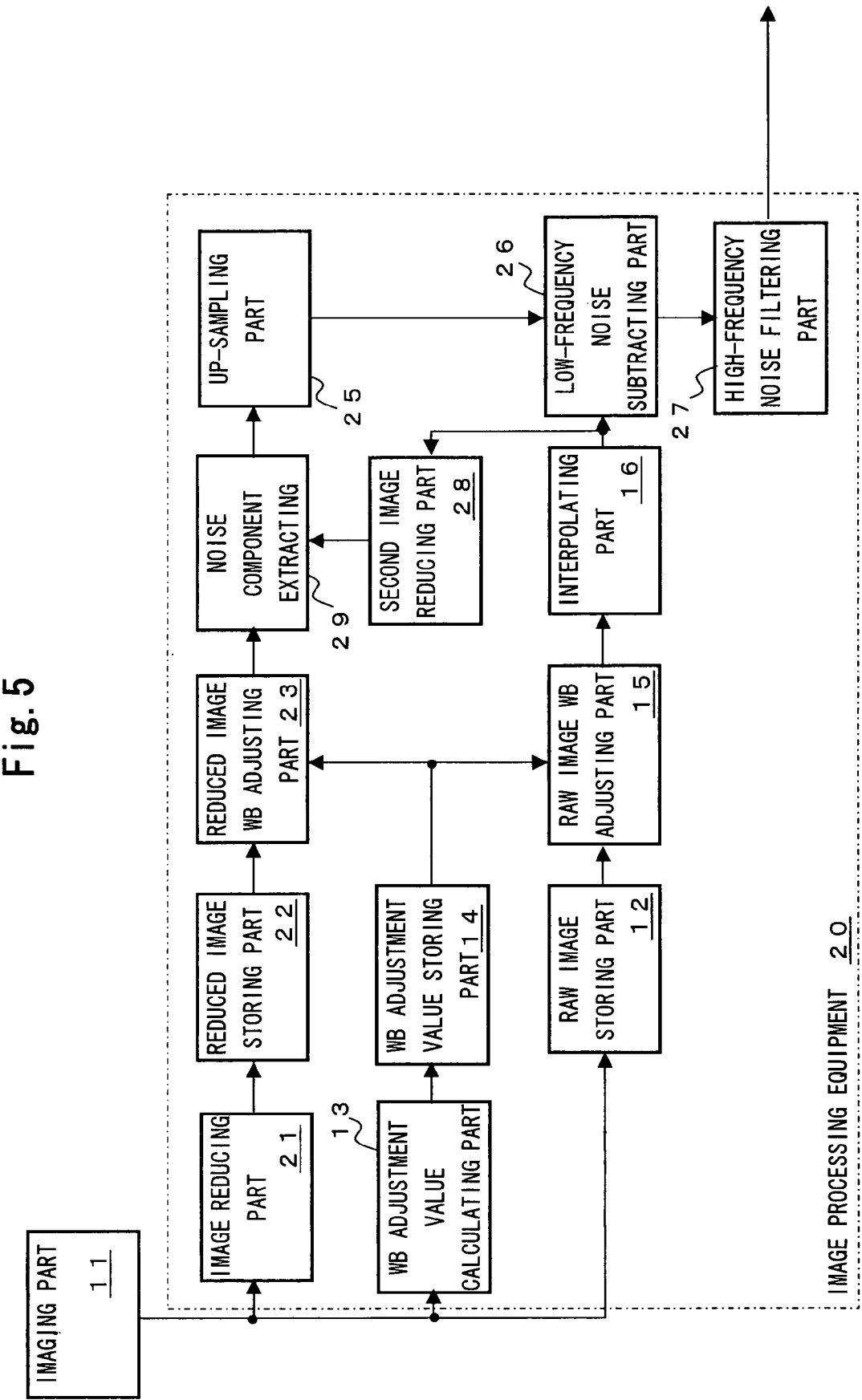
FIG. 5 is a view illustrating another embodiment of an image processing equipment.

Another embodiment of an image processing equipment is illustrated in FIG. 5.

Incidentally, among components illustrated in FIG. 5, the same reference numerals are added to the components equivalent of the components illustrated in FIG. 1, and description thereof is not given.

A second image reducing part 28 performs a reduction processing for the image data output from the interpolating part 16, and a second reduced pixel data being a pixel data of respective pixels included in a second reduced image in which the interpolating processed image is reduced, is generated.

A noise component extracting part 29 smoothes the second reduced pixel data by using a reduced image data received from the reduced image WB adjusting part 23, and extracts a difference between values before and after the smoothing of the second reduced pixel data as a noise component. In this smoothing processing, the second reduced pixel data may be used as a smoothing object image data, and the reduced image data received from the reduced image WB adjusting part 23 may be used as a reference image data in a publicly known noise filtering, for example, such as a ϵ filter.

There is a case when the low-frequency noise component included in the image generated at the interpolating part 16 and the low-frequency noise component included in the reduced image received from the reduced image WB adjusting part 23 are slightly different according to a processing manner of the interpolating part 16. By considering this, in the present embodiment, the low-frequency noise component is generated with reference to the second reduced image generated from an output image of the interpolating part 16. By this, it is possible to accurately extract the low-frequency noise component included in the image generated at the interpolating part 16 and to appropriately filter the low-frequency noise.

Embodiment 5

Figure 6:
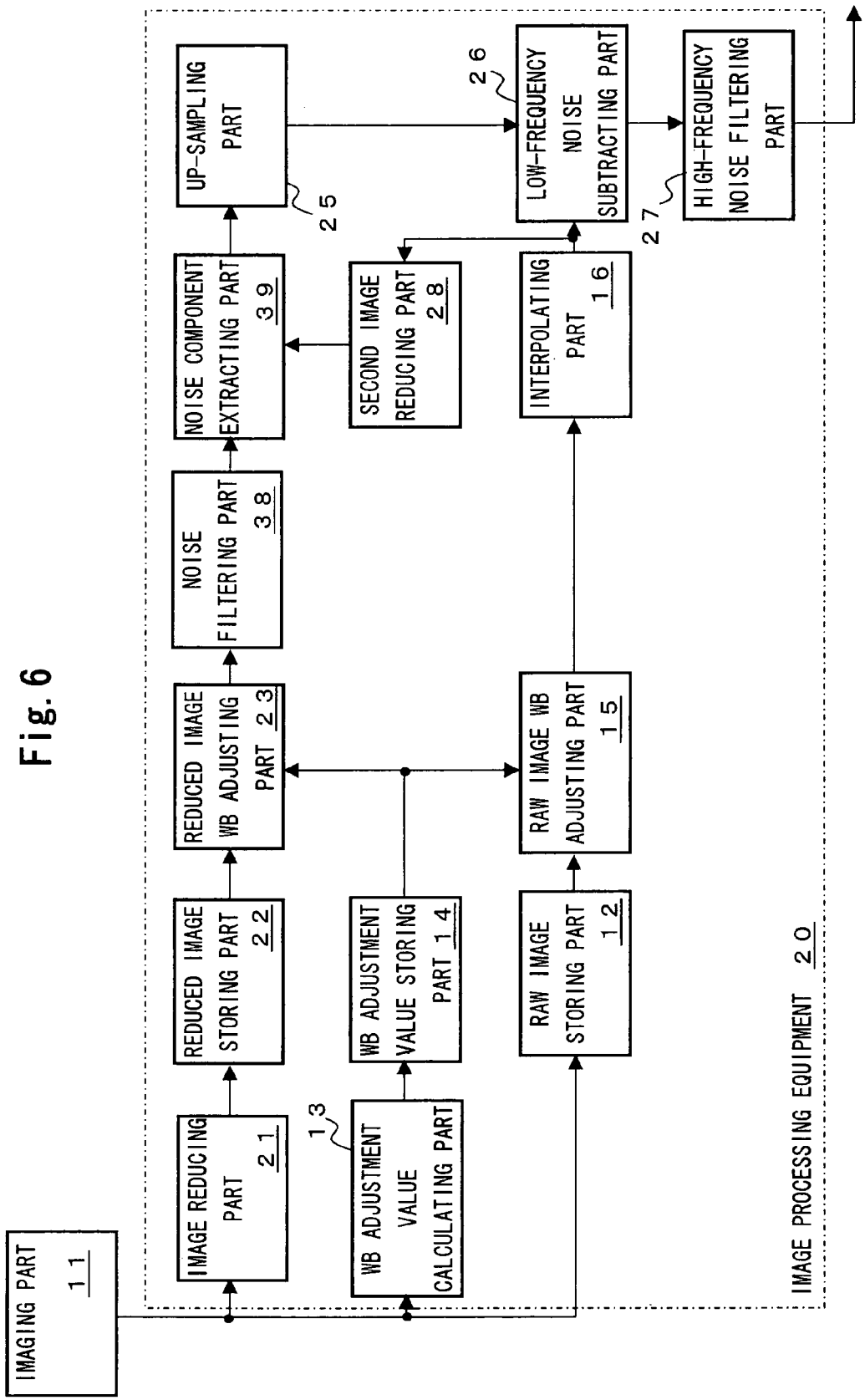
FIG. 6 is a view illustrating another embodiment of an image processing equipment.

Another embodiment of an image processing equipment is illustrated in FIG. 6. Incidentally, among components illustrated in FIG. 6, the same reference numerals are added to the components equivalent of the components illustrated in FIG. 1 and FIG. 5, and description thereof is not given.

A noise filtering part 38 performs the noise filtering for the reduced image data received from the reduced image WB adjusting part 23. A noise component extracting part 39 extracts the noise component by subtracting the noise filtered reduced image obtained by the processing of the noise filtering part 38 from the second reduced pixel data generated at the second image reducing part 28.

According to the present embodiment, it is possible to accurately extract the low-frequency noise component included in the image generated at the interpolating part 16 as same as the embodiment 4.

Embodiment 6

Figure 7:
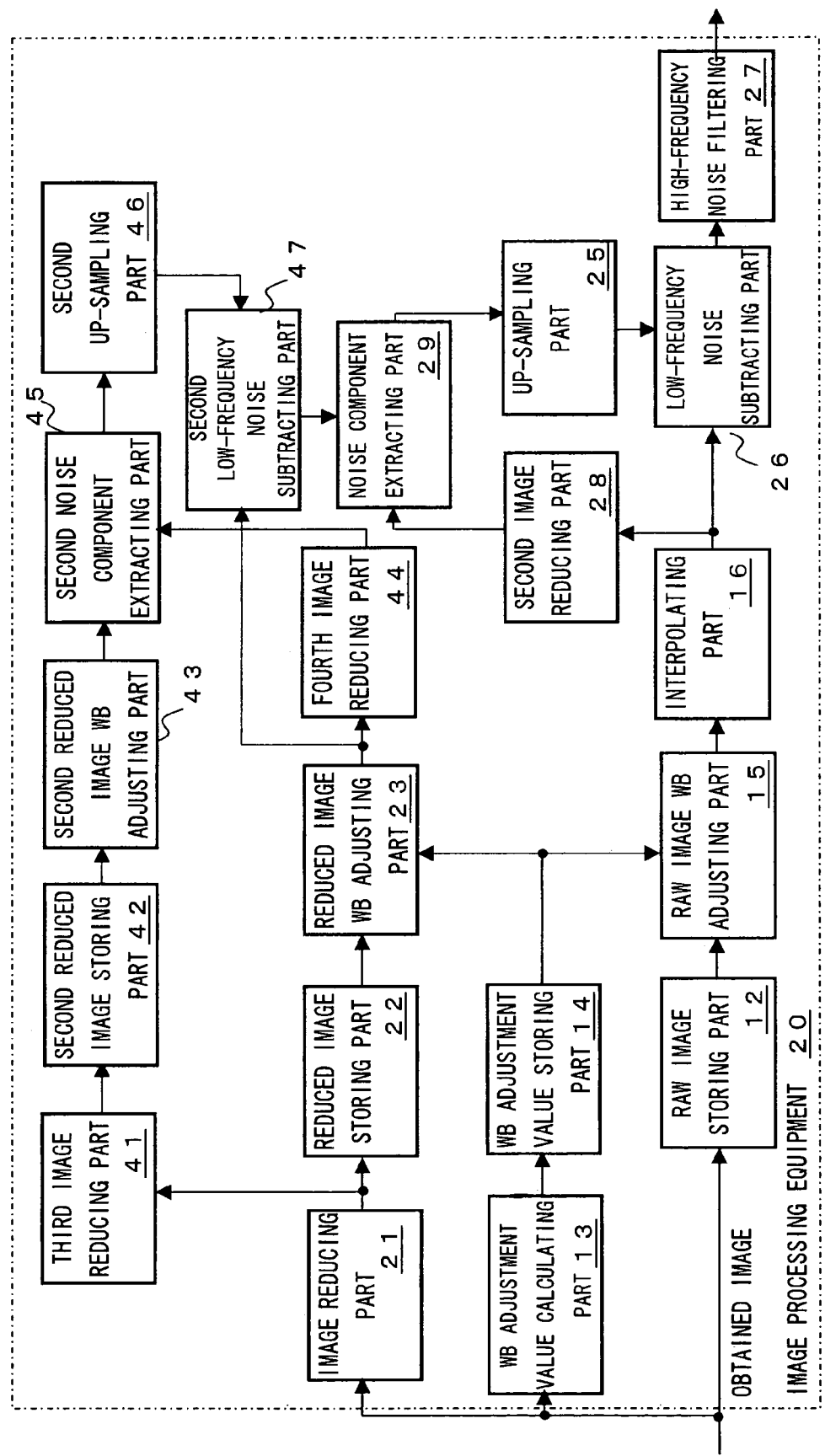
FIG. 7 is a view illustrating another embodiment of an image processing equipment.

Another embodiment of an image processing equipment is illustrated in FIG. 7. Incidentally, among components illustrated in FIG. 7, the same reference numerals are added to the components equivalent of the components illustrated in FIG. 1 and FIG. 5, and description thereof is not given.

A third image reducing part 41 further reduces the reduced image generated by the image reducing part 21 in parallel with the processing in which the RAW image storing part 12 stores the RAW image. A second reduced image storing part 42 stores a third reduced image generated at the third image reducing part 41 in parallel with the above-stated processing.

Next, a second reduced image WB adjusting part 43 performs a white balance adjusting processing on the pixel data sequentially read from the second reduced image storing part 42 by using the WB adjustment value calculated by the WB adjustment value calculating part 13. A reduced image which is further reduced from the reduced image being performed the white balance adjusting processing is generated by a fourth image reducing part 44. A fourth reduced pixel data being a pixel data of respective pixels included in the reduced image which is generated by the fourth image reducing part 44 is passed to the second noise component extracting part 45. The second noise component extracting part 45 extracts noise components of the fourth reduced pixel data as similar way as the noise component extracting part 29 with reference to the reduced image data received from the second reduced image WB adjusting part 43. A second up-sampling part 46 performs the up-sampling processing on the extracted noise component, and thereby, the low-frequency noise component corresponding to the reduced image being same size as the reduced image generated at the image reducing part 21 is generated. A second low-frequency noise subtracting part 47 subtracts the generated low-frequency noise component from the WB adjusted reduced image obtained by the reduced image WB adjusting part 23. The reduced image data of which low-frequency noise component is subtracted at the second low-frequency noise subtracting part 47 is provided for the processing of the noise component extracting part 29 as the same manner as the noise filtering being performed on the reduced image, which has finished the white balance adjusting processing, received from the reduced image WB adjusting part 23 in the embodiment 4. Hereinafter, the processing as same as in the embodiment 4 is performed.

According to the present embodiment, it is possible to filter the lower-frequency noise components than the embodiment 4. Incidentally, in the image processing equipment illustrated in FIG. 7, respective parts represented by adding the reference numeral 41 to the reference numeral 47 correspond to a "low-frequency noise filtering part" in claim 6. Incidentally, structures of filtering the low-frequency noises of the reduced image explained the present embodiments are one of the examples of the low-frequency noise filtering, and the low-frequency noises of the reduced image may be filtered by a method other than the above.

Incidentally, the reduced image generated at the third image reducing part 41 is further reduced, the processing as same as the above is added, and thereby, lower-frequency noises can be filtered.

According to the image processing equipment described hereinabove, the low-frequency noise components for the respective pixels of the reduced image are extracted with reference to the range corresponding to the spread of the low-frequency noises at a part of the reduced image which is already created. Accordingly, it is possible to achieve the pipeline processing using an extremely fewer line memories compared to a case when the low-frequency noises are extracted while storing a range assumed as a spread of the low-frequency noises in an obtained image such as a RAW image obtained from an imaging part.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image processing equipment, comprising:
   an image reducing part generating a reduced image of an obtained image being read;
   a reduced image storing part storing the reduced image being generated;
   an image storing part storing the obtained image in parallel with a processing by the image reducing part;
   a low-frequency noise component extracting part sequentially extracting a low-frequency noise component of each of pixels included in the obtained image based on pixel data of pixels included in a predetermined area of the reduced image at a portion corresponding to each of the pixels included in the obtained image; and
   a noise subtracting part sequentially reading pixel data corresponding to one of the obtained image stored in the image storing part and an adjusted image generated from the obtained image in synchronization with an output of the low-frequency noise component being extracted, and sequentially subtracting the low-frequency noise component from the pixel data being read, wherein
   respective processings by the low-frequency noise component extracting part and the noise subtracting part are pipelined, and
   the low-frequency noise component extracting part is configured to sequentially extract the low-frequency noise component by applying a spatial smoothing filter and comprises:
   a noise component extracting part sequentially extracting a noise component of each of pixels included in one of the reduced image and an adjusted reduced image generated from the reduced image based on pixel data of pixels included in a predetermined area, in which the predetermined area is in one of the reduced image and the adjusted reduced image from which the noise component is to be extracted; and
   an enlarging part performing an enlarging process on the noise component sequentially passed from the noise component extracting part, and sequentially generating the low-frequency noise component in each of the pixels included in the obtained image, in which the noise component extracting part extracts a difference between values before and after smoothing of the reduced image of the noise component.

2. The image processing equipment according to claim 1, wherein
   the low-frequency noise component extracting part further comprises:
   a second image reducing part sequentially generating a second reduced pixel data by performing a reduction processing on the adjusted image generated from the obtained image; and
   the noise component extracting part sequentially extracting a noise component of the second reduced pixel data based on the second reduced pixel data and the pixel data of the respective pixels included in the reduced image generated at the image reducing part.

3. The image processing equipment according to claim 2, wherein
   the noise component extracting part extracts the noise component by smoothing the second reduced pixel data based on the pixel data of the respective pixels included in the reduced image generated at the image reducing part.

4. The image processing equipment according to claim 2, further comprising:
   a reduced image noise filtering part filtering a noise of the pixel data of the respective pixels included in the reduced image generated at the image reducing part, wherein the noise component extracting part extracts a difference between the pixel data of the reduced image of which the noise is filtered at the reduced image noise filtering part and the second reduced pixel data as the noise component.

5. The image processing equipment according to claim 2, further comprising:
a reduced image low-frequency noise filtering part filtering a low-frequency noise of the reduced image generated at the image reducing part, wherein
the noise component extracting part sequentially extracts the noise component of the second reduced pixel data based on the pixel data of the reduced image generated at the image reducing part of which the low-frequency noise is filtered by the reduced image low-frequency noise filtering part.

6. The image processing equipment according to claim 1, further comprising:
an adjustment value calculating part calculating a white balance adjustment value of the obtained image in parallel with a process of storing the pixel data of the pixels of the obtained image in the image storing part; and
an adjustment applying part applying the white balance adjustment value to the pixel data of the obtained image received from the image storing part and transferring to a process of the noise subtracting part in parallel with a process of generating the low-frequency noise component.

7. An image processing equipment, comprising:
an image reducing part generating a reduced image of an obtained image being read;
a noise component extracting part sequentially extracting a noise component of each of pixels of the reduced image in a process of generating the reduced image;
a noise component storing part storing the noise component being extracted;
an image storing part storing the obtained image in parallel with a process by the image reducing part;
an enlarging part sequentially generating a low-frequency noise component in each of the pixels of the obtained image by performing an enlarging process on the noise component received from the noise component storing part; and
a noise subtracting part sequentially subtracting the low-frequency noise component sequentially passed from the enlarging part from pixel data of pixels included in one of the obtained image stored in the image storing part and an adjusted image generated from the obtained image, wherein
respective processings by the noise component extracting part, the enlarging part, and the noise subtracting part are pipelined, and
the noise component extracting part is configured to sequentially extract the noise component by applying a spatial smoothing filter, and comprises:
a noise component extracting part sequentially extracting a noise component of each of pixels included in one of the reduced image and an adjusted reduced image generated from the reduced image based on pixel data of pixels included in a predetermined area, in which the predetermined area is in one of the reduced image and the adjusted reduced image from which the noise component is to be extracted; and
the enlarging part performing the enlarging process on the noise component sequentially passed from the noise component extracting part, and the noise component extracting part extracts a difference between values before and after smoothing of the reduced image of the noise component.

8. The image processing equipment according to claim 7, further comprising:
an adjustment value calculating part calculating a white balance adjustment value of the obtained image in parallel with a process of storing the pixel data of the pixels of the obtained image in the image storing part; and
an adjustment applying part applying the white balance adjustment value to the pixel data of the obtained image received from the image storing part and transferring to a process of the noise subtracting part in parallel with a process of generating the low-frequency noise component.

9. A digital camera, comprising:
an imaging part;
an image reducing part generating a reduced image of an obtained image obtained at the imaging part;
a reduced image storing part storing the reduced image being generated;
an image storing part storing the obtained image in parallel with a process by the image reducing part;
a low-frequency noise component extracting part sequentially extracting a low-frequency noise component of each of pixels included in the obtained image based on a pixel data of a pixel included in a predetermined area of the reduced image at a portion corresponding to each of the pixels included in the obtained image; and
a noise subtracting part sequentially reading pixel data corresponding to one of the obtained image stored in the image storing part and an adjusted image generated from the obtained image in synchronization with an output of the low-frequency noise component being extracted, and sequentially subtracting the low-frequency noise component from the pixel data being read, wherein
respective processings by the low-frequency noise component extracting part and the noise subtracting part are pipelined, and
the low-frequency noise component extracting part is configured to sequentially extract the low-frequency noise component by applying a spatial smoothing filter, and comprises:
a noise component extracting part sequentially extracting a noise component of each of pixels included in one of the reduced image and an adjusted reduced image generated from the reduced image based on pixel data of pixels included in a predetermined area, in which the predetermined area is in one of the reduced image and the adjusted reduced image from which the noise component is to be extracted; and
an enlarging part performing an enlarging process on the noise component sequentially passed from the noise component extracting part, and sequentially generating the low-frequency noise component in each of the pixels included in the obtained image, in which the noise component extracting part extracts a difference between values before and after smoothing of the reduced image of the noise component.

10. The digital camera according to claim 9, further comprising:
an adjustment value calculating part calculating a white balance adjustment value of the obtained image in parallel with a process of storing the pixel data of the pixels of the obtained image in the image storing part; and
an adjustment applying part applying the white balance adjustment value to the pixel data of the obtained image received from the image storing part and transferring to a processing of the noise subtracting part in parallel with the processing of generating the low-frequency noise component.

11. A digital camera, comprising:
an imaging part;
an image reducing part generating a reduced image of an obtained image obtained at the imaging part;
a noise component extracting part sequentially extracting a noise component of each of pixels of the reduced image in a process of generating the reduced image;
a noise component storing part storing the noise component being extracted;
an image storing part storing the obtained image in parallel with a process by the image reducing part;
an enlarging part sequentially generating a low-frequency noise component in each of the pixels of the obtained image by performing an enlarging process on the noise component received from the noise component storing part; and
a noise subtracting part sequentially subtracting the low-frequency noise component sequentially passed from the up-sampling part from pixel data of pixels included in one of the obtained image stored in the image storing part and an adjusted image generated from the obtained image, wherein
respective processings by the noise component extracting part, the enlarging part, and the noise subtracting part are pipelined, and
the noise component extracting part is configured to sequentially extract the noise component by applying a spatial smoothing filter, and comprises:
a noise component extracting part sequentially extracting a noise component of each of pixels included in one of the reduced image and an adjusted reduced image generated from the reduced image based on pixel data of pixels included in a predetermined area, in which the predetermined area is in one of the reduced image and the adjusted reduced image from which the noise component is to be extracted; and
the enlarging part performing the enlarging process on the noise component sequentially passed from the noise component extracting part, and sequentially generating the low-frequency noise component in each of the pixels included in the obtained image, in which the noise component extracting part extracts a difference between values before and after smoothing of the reduced image of the noise component.

12. The digital camera according to claim 11, further comprising:
an adjustment value calculating part calculating a white balance adjustment value of the obtained image in parallel with a process of storing the pixel data of the pixels of the obtained image in the image storing part; and
an adjustment applying part applying the white balance adjustment value to the pixel data of the obtained image received from the image storing part and transferring to a processing of the noise subtracting part in parallel with the processing of generating the low-frequency noise component.

13. An image processing equipment, comprising:
an image reducing part generating a reduced image of an obtained image being read;
a reduced image storing part storing the reduced image being generated;
an image storing part storing the obtained image in parallel with a processing by the image reducing part;
a low-frequency noise component extracting part sequentially extracting a low-frequency noise component of each of pixels included in the obtained image based on pixel data of pixels included in a predetermined area of the reduced image at a portion corresponding to each of the pixels included in the obtained image; and
a noise subtracting part sequentially reading pixel data corresponding to one of the obtained image stored in the image storing part and an adjusted image generated from the obtained image in synchronization with an output of the low-frequency noise component being extracted, and sequentially subtracting the low-frequency noise component from the pixel data being read, wherein
respective processings by the low-frequency noise component extracting part and the noise subtracting part are pipelined, and
the low-frequency noise component extracting part comprises:
a second image reducing part sequentially generating a second reduced pixel data by performing a reduction processing on the adjusted image generated from the obtained image;
a noise component extracting part sequentially extracting a noise component of the second reduced pixel data based on the second reduced pixel data and the pixel data of the respective pixels included in the reduced image generated at the image reducing part; and
an enlarging part performing an enlarging process on the noise component sequentially passed from the noise component extracting part, and sequentially generating the low-frequency noise component in each of the pixels included in the obtained image.

14. The image processing equipment according to claim 13, wherein
the noise component extracting part extracts the noise component by smoothing the second reduced pixel data based on the pixel data of the respective pixels included in the reduced image generated at the image reducing part.

15. The image processing equipment according to claim 13, further comprising:
a reduced image noise filtering part filtering a noise of the pixel data of the respective pixels included in the reduced image generated at the image reducing part, wherein
the noise component extracting part extracts a difference between the pixel data of the reduced image of which the noise is filtered at the reduced image noise filtering part and the second reduced pixel data as the noise component.

16. The image processing equipment according to claim 13, further comprising:
a reduced image low-frequency noise filtering part filtering a low-frequency noise of the reduced image generated at the image reducing part, wherein
the noise component extracting part sequentially extracts the noise component of the second reduced pixel data based on the pixel data of the reduced image generated at the image reducing part of which the low-frequency noise is filtered by the reduced image low-frequency noise filtering part.

17. An image processing equipment, comprising:
an image reducing part generating a reduced image of an obtained image being read;
a reduced image storing part storing the reduced image being generated;

an image storing part storing the obtained image in parallel with a processing by the image reducing part;

a low-frequency noise component extracting part sequentially extracting a low-frequency noise component of each of pixels included in the obtained image based on pixel data of pixels included in a predetermined area of the reduced image at a portion corresponding to each of the pixels included in the obtained image; and a noise subtracting part sequentially reading pixel data corresponding to one of the obtained image stored in the image storing part and an adjusted image generated from the obtained image in synchronization with an output of the low-frequency noise component being extracted, and sequentially subtracting the low-frequency noise component from the pixel data being read, wherein respective processings by the low-frequency noise component extracting part and the noise subtracting part are pipelined, and the low-frequency noise component extracting part is configured to sequentially extract the low-frequency noise component by applying a spatial smoothing filter, wherein the low-frequency noise component extracting part comprises:

a second image reducing part sequentially generating a second reduced pixel data by performing a reduction processing on the adjusted image generated from the obtained image;

a noise component extracting part sequentially extracting a noise component of the second reduced pixel data based on the second reduced pixel data and the pixel data of the respective pixels included in the reduced image generated at the image reducing part; and an enlarging part performing an enlarging process on the noise component sequentially passed from the noise component extracting part, and sequentially generating the low-frequency noise component in each of the pixels included in the obtained image.

18. The image processing equipment according to claim 17, wherein the noise component extracting part extracts the noise component by smoothing the second reduced pixel data based on the pixel data of the respective pixels included in the reduced image generated at the image reducing part.

19. The image processing equipment according to claim 17, further comprising:

a reduced image noise filtering part filtering a noise of the pixel data of the respective pixels included in the reduced image generated at the image reducing part, wherein the noise component extracting part extracts a difference between the pixel data of the reduced image of which the noise is filtered at the reduced image noise filtering part and the second reduced pixel data as the noise component.

20. The image processing equipment according to claim 17, further comprising:

a reduced image low-frequency noise filtering part filtering a low-frequency noise of the reduced image generated at the image reducing part, wherein the noise component extracting part sequentially extracts the noise component of the second reduced pixel data based on the pixel data of the reduced image generated at the image reducing part of which the low-frequency noise is filtered by the reduced image low-frequency noise filtering part.

* * * * *